Aug. 22, 1950 — L. W. MITCHELL — 2,519,590
POWER TRANSMISSION BELT COVER
Filed Dec. 27, 1949
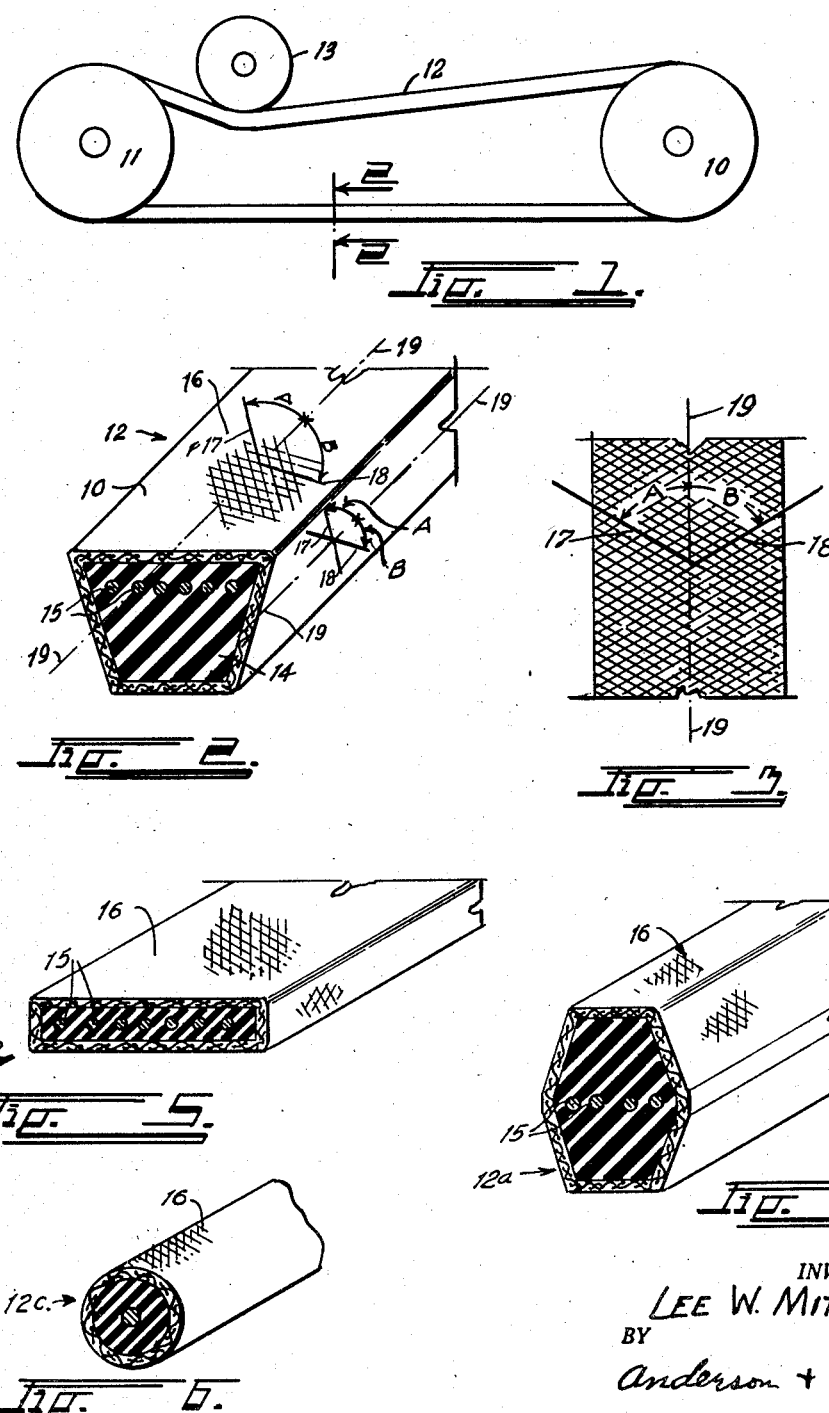
INVENTOR.
LEE W. MITCHELL
BY
Anderson + Muller
ATTORNEYS.

Patented Aug. 22, 1950

2,519,590

UNITED STATES PATENT OFFICE 2,519,590

POWER TRANSMISSION BELT COVER

Lee W. Mitchell, Denver, Colo., assignor to The Gates Rubber Company, Denver, Colo., a corporation of Colorado Application December 27, 1949, Serial No. 135,219

2 Claims. (Cl. 74—233)

This invention relates to improvements in fabric covered power transmission belts.

In the art of belt making it has been common practice in the past to provide belts with so-called "bias-cut" covers. These covers are of woven fabric with the warp and weft threads disposed in right angular relation, the cover material being cut on a bias to form strips, and when wrapped about the belt, disposes the warp and weft threads, respectively, at a 45° angle, or less than 45°, to longitudinal axes of the cover, the 45° angle being the maximum formerly obtainable with the particular cover materials employed. The wrapping of covers about a belt is common in the art, such covers being distinguished from covers which are braided or otherwise formed about the belt as tubes. Wrapped covers of this general class and as employed in the present invention are disclosed by the patents to Freedlander 2,121,222 and Evans 2,439,043.

To attain maximum life of a belt of the foregoing type, which life may be roughly defined as a condition wherein the wearing surfaces of the belt have substantially completely and evenly worn away without producing cover cracks or cracks in the belt core, it is necessary that the belt operate over relatively large sheaves so that bending of the cover does not exceed certain limits. If the same belt be operated on smaller sheaves, or if the cover be reversely bent by use of an idler sheave against the back side of the belt, the belt life will be materially reduced and cracks in the cover will appear long before the cover has served its most useful possible life.

It is, of course, highly desirable to operate belts on sheaves of the smallest possible diameter to reduce size of power transmission systems, cost thereof, and for other reasons of design. The designer of the power transmission system is therefore constantly seeking belts which have greater flexibility and improved wear characteristics, which belts do not otherwise sacrifice certain desired characteristics.

It has now been found that the life of a bias-cut fabric belt of the type above referred to is a function of the angle of the warp and weft threads to the longitudinal axes of the belt cover and that a 45° relationship to such axes, formerly believed optimum, is not the optimum angle when belts are operated under conditions of relatively high belt flexure. It has now been conclusively determined that belt life is materially increased when said angles are increased beyond 45°.

The principal object of the present invention, accordingly, is to provide a belt having a cover thereon in which the warp and weft threads are disposed at an included angle greater than 90° and less than 180°.

Further objects are to provide a covered belt which has improved flexibility, improved adhesion of the cover to the core, long wearing characteristics, and reduction of strains in the cover threads.

Still further objects, advantages and salient features will become more apparent from a consideration of the description to follow, the appended claims, and the accompanying drawing, in which:

Figure 1 is a side elevation of a typical sheave arrangement employing a belt which forms the subject of the present invention;

Figure 2 is an enlarged section taken on line 2—2, Figure 1, a portion of the belt being shown isometrically;

Figure 3 is an enlarged transverse view of a portion of the belt;

Figure 4 is a view similar to Figure 2 showing the cover applied to a so-called "double-V" belt;

Figure 5 is a similar view of a flat belt; and

Figure 6 is a similar view of a round belt.

Referring in detail to the drawing, a typical power transmission system is shown in Figure 1, this comprising a drive sheave 10, a driven sheave 11, a V-belt 12 trained thereabout, and a flat faced idler pulley 13 which engages the wide side of the belt to remove slack between the sheaves. So far as the invention is concerned, in its broadest aspects, the idler pulley is optional and may be dispensed with.

The belt 12 comprises a conventional core of rubber-like material 14 having endless tension cords 15 therein and a fabric cover 16 surrounding the core and vulcanized to the latter.

The cover 16 is of woven fabric, the warp threads 17 being at an angle A+B to the weft threads 18. The angle A+B is in excess of 90°, and as shown, is about 120°, with angle A equal to angle B, that is, 60° each, these angles being between the warp and weft threads and a longitudinal axis 19 of the belt cover. In the old and conventional cover, previously referred to, angles A and B are 45° each, or less.

While a V-belt has been described above, the invention is not limited to the particular shape of the belt. In Figure 4 a "double-V" belt 12a is shown having the particular cover material 16, above described, applied thereto. In Figure 5 a flat belt 12b is shown, covered with the same material, and in Figure 6 a round belt is shown, also covered with the same material. Thus, the only essential difference between any of the figures is in the shape of the belt core, and it is to be understood that in each figure the warp and weft threads are disposed in the same relationship to each other, or to longitudinal axes through the cover, as described for Figures 1 to 3. It will be understood that where an idler pulley is employed with the belts shown in Figures 4 and 6, the face of such pulley may be V-shaped if desired.

It is to be understood that the 120° angle shown is exemplary only, and this angle may be increased or decreased. An angle of 150° has been found to produce a cover having greatly increased life over the old and well-known cover previously described.

It is to be understood that the material may be rubberized with a friction coat, skim coat, or otherwise prepared for vulcanization to the core as is well-known in the art. It is also to be understood that the particular core may be formed in any manner well-known in the art, and more than one cover thickness may be employed. Many modifications will become apparent within the spirit of the invention, and hence the drawing is to be regarded as exemplary only and the invention not limited thereto, except as defined by the scope of the appended claims.

Having described the invention, what I claim as new is:

1. A power transmission belt comprising a core and an exposed woven fabric wrapped cover secured thereabout, said cover having warp and weft threads, said threads being disposed at an angle greater than 47½° and less than 75° to the longitudinal axis of the belt.

2. A belt in accordance with claim 1 wherein said warp and weft threads are disposed at substantially equal angles to said longitudinal axis.

LEE W. MITCHELL.

REFERENCES CITED

The following references are of record in the file of this patent:

UNITED STATES PATENTS

| Number | Name | Date |
|--------|------|------|
| 811,597 | Voland et al. | Feb. 6, 1906 |
| 1,279,601 | Spadone | Sept. 24, 1918 |
| 1,280,461 | Heilig | Oct. 1, 1918 |
| 1,906,397 | Meyer | May 2, 1933 |
| 1,989,168 | Freedlander | Jan. 29, 1935 |